Sept. 15, 1931. A. O. ABBOTT, JR 1,823,226
POWER TRANSMITTING APPARATUS
Filed Nov. 20, 1926
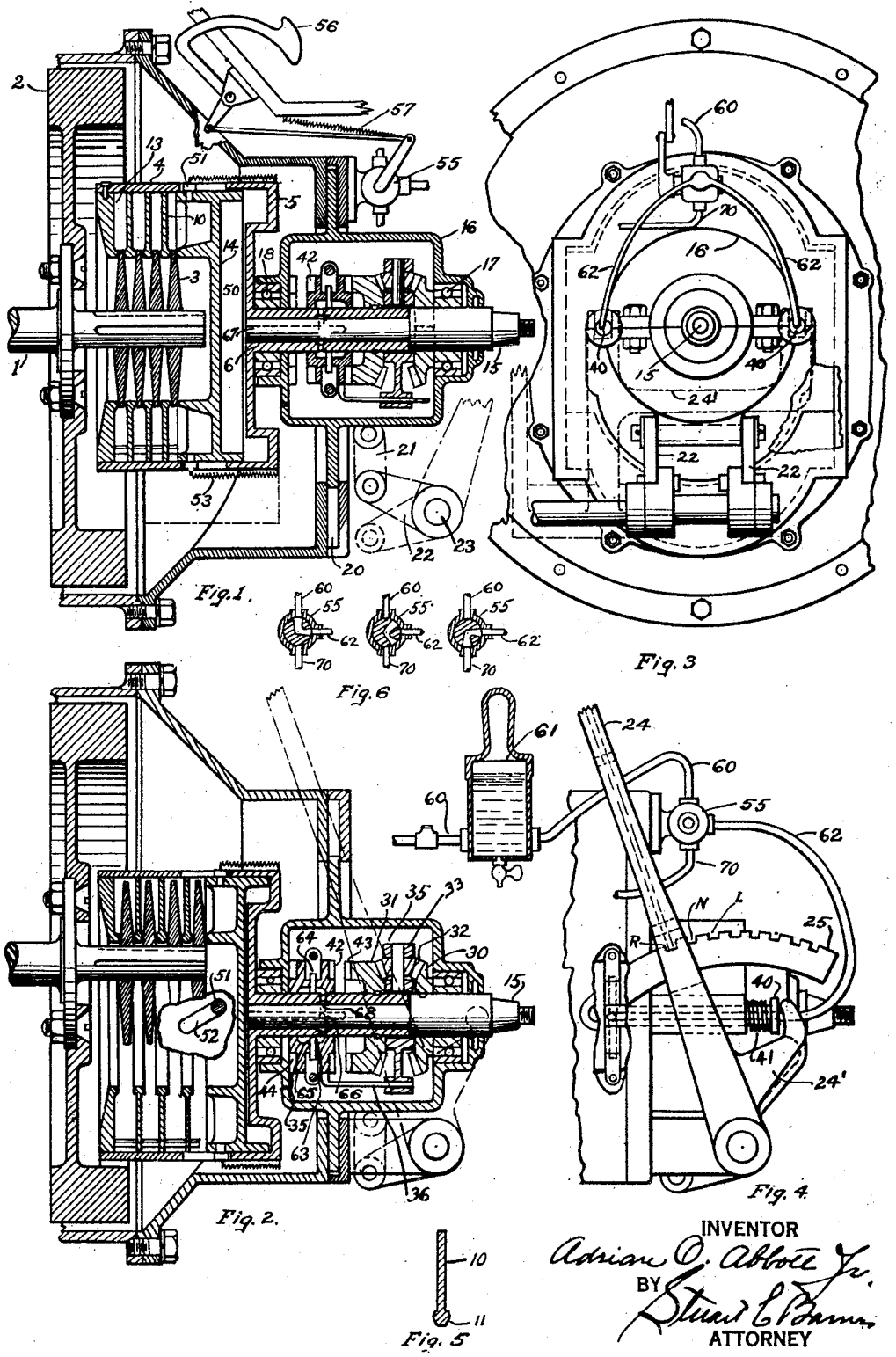

Patented Sept. 15, 1931

1,823,226

UNITED STATES PATENT OFFICE

ADRIAN O. ABBOTT, JR., GROSSE POINTE PARK, MICHIGAN

POWER TRANSMITTING APPARATUS

Application filed November 20, 1926. Serial No. 149,563.

This invention relates to a power transmitting apparatus, and it has to do with such apparatus of a variable speed character.

More particularly, the invention is directed to a transmission which is adapted for use with automotive vehicles. Transmissions of the friction type have been proposed with the thought of overcoming the objections to the selective gear type of transmission. These friction devices however, have been objectionable for a number of reasons, among which may be mentioned the lack of efficiency due to relative scrubbing between driving parts and the driven parts. The pressure necessary to bring the driving and driven parts together has caused excessive pressure on the bearings which is objectionable as it causes undue wear and short life of the bearings.

The present invention aims to provide a variable speed transmission of the friction type which overcomes the objections to those heretofore proposed. The driving member and the driven member are movable relative to each other to effect speed variation, and the arrangement is such that the nature of the contact between them remains substantially unchanged throughout the range of movement. The transmission also involves a separate clutch device which is in association with the driven member whereby forward or reverse speeds may be obtained, and this device is so constructed and disposed as to be unaffected by the relative movement between the driving and driven members.

In accordance with the invention, the pressure which is brought to bear on the parts so as to force the driving and driven members together is not communicated to the bearings so that no undue wear upon the bearings results. The invention contemplates the use of fluid pressure for effecting the driving relation between the friction members, and this fluid pressure is controllable so that a nicety of operation is obtained. In addition to this, the construction of the parts may be such that there is a tendency during rotative movement of the parts for the driving and driven members to come together, thus aiding the action of the fluid pressure.

The transmission of this invention has the advantages of a practically noiseless operation which is characteristic of friction transmissions, and at the same time it is comparable in efficiency to the selective gear type of transmission. It overcomes, however, not only the objections to the friction transmissions heretofore proposed, but it also overcomes the objectionable break in the continuity of driving characteristic of the gear type, thus eliminating the shock which results from the changing of one gear to another.

In the accompanying drawings, Fig. 1 is a sectional view taken through the frictional driving member and the separate clutch device, showing the parts in high speed driving position.

Fig. 2 is a view similar to Fig. 1, showing the frictional driving member in low speed adjustment, and showing the separate clutch device in reverse position.

Fig. 3 shows the structure of Fig. 1 in end elevation.

Fig. 4 is a detail view showing the speed control lever.

Fig. 5 is an enlarged sectional view of one of the friction members of the driven part showing the curved friction surfaces.

Fig. 6 is an enlarged detail of the valve structure for controlling the flow of fluid under pressure showing the three positions of the valve, namely, operating position, closed position and exhaust position.

Referring now to the drawings, the crank shaft of an engine is shown at 1, having the usual flywheel 2. Secured to the outer end of the shaft are a number of friction driving discs 3. Four of such discs are shown in the present instance, and these may be splined or keyed to the shaft to rotate therewith.

The driven member of the frictional transmission takes the form of a housing 4, which is closed by a rear wall 5, and includes a tubular extension 6. Within the housing are annular members 10 which frictionally engage the driving members 3. As shown in Fig. 5, these members have enlarged ends which are provided with curved or arcuate surfaces 11. These curved surfaces of the members contact with the driving disks. Thus a line contact with the driving disks is afforded throughout the entire movement from that shown in Fig. 1 to that of Fig. 2. A friction member 13 is positioned at the forward end of the housing and within the housing is a piston 14. Both these members have one curved friction surface similar to the members 10. The driving disks are tapered and are mounted upon the shaft so as to move longitudinally thereof. Likewise the friction members 10 are mounted so as to move longitudinally of the housing. In Fig. 1 the driving and driven members are close together, but by reference to Fig. 2 it will be observed that they are somewhat separated due to the increasing thickness of the driving disks.

Rotatably mounted within the tubular extension 6 of the housing, is a shaft 15 which transmits the power to the driving wheels of the vehicle, if the unit is used with an automobile. This shaft may be driven in forward and reverse direction, or it may be disconnected so as to remain idle. For this purpose a clutch mechanism is disposed within a housing 16 which is mounted upon the exterior of the shaft and the extension. Suitable bearings 17 and 18 support the housing on the shaft and extension respectively.

The driven parts, including the housing 5 and housing 16, are vertically movable with respect to the driving disks 3. For this purpose a guide mechanism 20 is provided which guides the members in their movement. For controlling this movement the housing has connected thereto links 21, which are in turn connected to arms 22, secured to a rock shaft 23 operable by a lever 24. A ratchet device 25 (Fig. 4) may be used in connection with the lever. It will be observed that upon movement of the lever the housing 16 together with the housing 5 is raised or lowered in the guide devices, thus varying the position of the line of contact between the driven parts and the driving disks. In Fig. 1 the parts are in high speed position and in Fig. 2 the driven parts are lowered and are in low speed position.

The clutch mechanism within the housing 16 consists of a variable gear reversing head which includes a beveled gear 30, keyed to the shaft 15, a beveled gear 31 keyed to the extension 6, and between these gears are a number of pinions 32 carried by a yoke 33. Slidably mounted upon the extension 6 is a clutch member 35 which is locked in rotative movement with the yoke 33 by means of an arm 36, which slidably engages the yoke. Any number of such arms may be provided. This yoke member is reciprocated on the extension 6 by means of the lever 24. For this purpose the clutch member is mounted upon a pair of guide rods 40 (Figs. 3 and 4) which are normally forced outwardly by means of springs 41, thus tending to hold the clutch 35 in the position shown in Fig. 1. The lever 24 is provided with members 24' for engaging the guide rods and they serve to reciprocate the clutch member 35 which is carried by the rods.

The clutch member 35 is provided on either side with suitable formations 42, such as dogs, adapted to engage with similar formations 43 on the bevelled gear 31 and 44 on the housing 16.

This clutch arrangement drives the shaft 10 in forward or reverse position, or disconnects the shaft 10 from driving relation. Fig. 1 shows the clutch in forward driving relation. In this position the housing 5 is rotated by reason of the frictional contact with the disks 3. This causes the rotation of the extension 6 and the gear 31 which is keyed thereto. Since the clutch member 35 is locked with the gear 31 and the member 35 is locked to the yoke 33 by the members 36, these members also rotate. Thus the pinions 32 rotate with the gear 31, but they remain stationary on their respective mountings, thus causing the bevelled gear 30, which is pinned to the shaft 10, to rotate. Briefly reiterating, the tubular extension 6 and the shaft 10 are locked together in rotative movement by reason of the locking together of the two bevelled gears and the clutch member 35.

In Fig. 2 the parts are in position to drive the shaft 10 in reverse direction. The member 35 is locked to the housing 16, and therefore held stationary. This also holds the yoke 33 stationary. As the extension 6 rotates, the bevelled gear 31 also rotates, and because the yoke is stationary, the pinions 32 turn on their respective mountings. The pinions thus cause the rotation of the bevelled gear 30 and shaft 15 reverse to that in the condition shown in Fig. 1. When the clutch member 35 is disposed in its central position so as not to engage the housing or the gear 31, the shaft 15 remains idle. In this neutral position the turning of the bevelled gear 31 causes the yoke and the pinions to rotate and the pinions merely idle upon the stationary bevelled gear 30 when the friction drive is in driving position.

Having thus described the features of the frictional drive, and how the driven member is moved to vary the driving speed, and having also described the separate clutch mechanism whereby forward, reverse, and neutral positions may be had, the manner in which pressure is brought in order to hold the frictionally engaging members together, will now be taken up. The pressure is afforded through the means of the piston 14 and it will be observed that there is a chamber 50 between this piston and the rear wall of the housing 5. This piston is slidable in the housing, and it is provided with pins 51 which ride in slots 52 in the housing. The piston 14 is actuated by means of the admis- sion and exhaust of fluid under pressure to the chamber 50. This fluid is preferably oil, and may be the oil used for lubrication of the engine. Springs 53 in any suitable number may be used, and these springs normally tend to retract the piston. No oil sealing rings need to be provided as any oil which flows around the piston enters the compartment containing the friction disks and lubricating oil here is desirable.

The slots 52 are disposed at an angle, and as the piston moves a slight rotative movement relative to the housing results through the action of the slots. The arrangement of the slots in this manner prevents canting of the piston within the housing. By reference to Fig. 2, it will be noted that fluid pressure upon the piston would tend to cant the piston by movement of the lower portion of the piston forwardly, since only the upper part of the piston contacts directly with the friction disks. However, the lower pins and slots prevent this canting because the pins are caused to abut against one side of the slots.

For the purpose of controlling the admission and exhaust of the oil, a valve 55 is provided, and this valve is connected to a foot lever 56. A spring 57 is connected to the valve, and this spring normally holds the valve in operating position. Oil under pressure is brought to the valve through a suitable conduit 60 (Fig. 4). For this purpose the force feed lubrication system of the automobile vehicle engine may be used, if the engine is so constructed. Otherwise any commercial type of pumping device may be used. A pressure device 61 may be disposed in the line 60 and the oil is pumped into this device so that a pressure is built up. Leading from the controlling valve 55 are conduits 62. These conduits are preferably flexible and lead into the guide rods 40 upon which the reciprocating clutch member 35 operates. The guide rods are hollow for the purpose of conducting the oil. The flexibility of the conduits permit movement incident to the raising and lowering of the driven member. The ducts in the guide rods communicate with an annular chamber 63 (Fig. 2) in the member 35 through ducts 64. From here the oil passes through channels 65 in the tubular extension, thence through holes 66 in the shaft 15 which is longitudinally drilled, as shown at 67 for the passage of oil in the chamber 50. The extension 6 may be formed with an annular recess 68 for the purpose of conducting the oil from the passageways 65 to the holes 66.

An exhaust conduit 70 (Fig. 4) leads from the control valve 55, and this exhaust line may be arranged to discharge exhausted oil into the crank case of the engine.

The operation of this oil control arrangement is as follows: When the parts are in driving position, as shown in Fig. 1, the valve connects oil under pressure in the conduit 60 with the conduits 62 (left hand view of Fig. 6). Thus oil under pressure passes through the several connecting ducts and into the chamber 50, forcing the piston 14 forwardly with pressure and causing frictional engagement between the driving and driven members with sufficient force for the purpose.

At this point an additional advantage of the angularly disposed slots 52 may be brought out. When the driving member is rotated, the piston also rotates and the action of the slanting slots against the pins 51 is such as to tend to move the piston 14 forwardly thus aiding the pressure action. Movement of the foot pedal 56 forwardly actuates the valve and cuts off the connection between the incoming conduit 60 and the outgoing conduit 62 (center view of Fig. 6). This cuts off the supply of oil under pressure. Further movement of the pedal opens ports in the valves which connect conduit 62 with the exhaust conduit 70, leading to the crank case of the engine (right hand view of Fig. 6). This allows the oil in the chamber 50 to exhaust and the piston to retract under the action of the springs 53, thus disengaging the frictional contact.

At this time the lever 24 may be pushed forwardly, if desired, to bring into effect a lower driving speed, whereupon the release of the pedal again brings the fluid pressure into play, and connects the friction drive. However, if it is desired to momentarily release the drive without changing speed, the pedal may be pushed inwardly to its extreme position allowing some of the oil to escape, whereupon it may be allowed to retract slightly until all ports in the valve 55 are closed, thus holding the piston 14 slightly retracted and breaking the friction drive. Springs may be disposed between the driving disks 3 and the driven members 10 so as to normally separate them. However, it is preferred to mount the members without the springs.

By reference to Fig. 4, the lever and ratchet arrangement will be seen. The forward notch R of the ratchet is reverse speed. The next adjacent notch, referenced N, is neutral, and in this position the member 35 of the separate clutch device is disposed centrally on the extension 6. The notch L is for low speed, and when the lever is in this notch the separate clutch device is engaged for forward driving and the friction drive is in a position shown in Fig. 1. In changing from low to high, the lever may be moved notch by notch, or it may be moved with a steady speed from low to high. This is easily accomplished because it has been found that the device has a tendency to automatically move from low position to high position when in driving operation. The degree to which the disks are tapered has an effect upon the automatic movement from low to high. Accordingly the taper may be varied according to the power of the engine. For example, with an engine of little power the taper should not be great, so that the movement from low to high is relatively slow, and with an engine of more power a greater taper can be used, so that the movement from low to high is thus faster. In order to stop a vehicle equipped with this construction, the pedal 56 is pressed inwardly, thus discharging the oil, whereupon the control lever 24 may be moved to neutral position.

If desired, any convenient means may be provided for stopping the supply of fluid under pressure to the control valve. For this purpose a valve can be inserted in the pipe line between the pressure device 51 and the control valve 55, and locking means may be provided so that the automobile may be locked when it is left standing.

What I claim is:

1. In a power transmitting apparatus, the combination of a driving member, a driven member adapted at times to frictionally engage said driving member with linear contact, and a separate clutch device in association with the driven member and operable to reverse the direction in which the power is transmitted, said driven member and said separate clutch device both being movable as a unit relative to the driving member by sliding movement substantially in a straight line to effect speed variations, and guide devices for guiding the driven member and separate clutch device in such movement.

2. In a power transmitting apparatus, the combination of a driving member, a driven member adapted to linearly and frictionally engage the driving member, said member including a housing having a chamber, a free piston operable in the chamber for controlling the frictional engagement, angularly disposed slots in the wall of the chamber and pins on the piston for engagement with the slots for guiding the piston in its movement and for preventing canting of the piston in the chamber.

3. In a variable speed power transmitting apparatus, the combination of a plurality of driving discs tapered in cross section and a plurality of driven members overlapping and frictionally engaging the driving discs with linear contact, said driving discs and driven members being movable relative to each other to effect speed variations, fluid pressure means including oil under pressure for effecting a uniform pressure under which the discs and driven members engage, mechanical means through which the oil under pressure acts, the said oil also having access to and lubricating the frictionally contacting driving discs and driven members.

4. A variable speed power transmitting device comprising in combination, a plurality of tapered driving disks mounted upon a shaft and axially shiftable thereon, a driven member in the form of a housing, a plurality of members carried by the housing and projecting between the tapered driving disks having substantially curvilinear contact therewith, a piston shiftable axially in the housing arranged to pack the driving disks and driven members together, fluid pressure means acting upon the piston to pack the driving and driven members together, spring means acting upon the piston in reverse direction, means for radially shifting said housing to vary the line of contact between driving and driven members whereby they contact at times only on one side of the axis and whereby the position of the piston in packing relation varies axially, and means connecting the piston and housing consisting of guideways disposed at an angle to the axial direction, and guide devices therein for holding the piston against canting action.

5. A variable speed power transmitting device comprising in combination, a plurality of tapered driving disks mounted upon a shaft and axially shiftable thereon, a driven member in the form of a housing, a plurality of members carried by the housing and projecting between the tapered driving disks having substantially curvilinear contact therewith, a piston shiftable axially in the housing arranged to pack the driving disks and driven members together, fluid pressure means acting upon the piston to pack the driving and driven members together, spring means acting upon the piston in reverse direction, means for radially shifting said housing to vary the line of contact between driving and driven members whereby they contact at times only on one side of the axis and whereby the position of the piston in packing relation varies axially, and means connecting the piston and housing consisting of guideways disposed at an angle to the axial direction, and guide devices therein for holding the piston against canting action, a driven shaft carried by the housing, a casing carried by the shaft, and a reverse and neutral gearing in said casing on said shaft and movable with the housing.

6. A transmission comprising in combination, a drive shaft, a plurality of tapered drive disks thereon and axially shiftable, a driven housing having inwardly extending devices engaged between the tapered disks, a driven shaft carried by the housing, a chamber in the housing located between the driven shaft and the drive shaft, a piston therein, fluid pressure means acting upon the piston to pack the driving and driven members together, said piston, due to the tapered disks, assuming varying axial positions in operating position, and said fluid pressure serving to press the piston with uniformity in any position, means acting upon the piston reverse to the fluid pressure action, the driven members of the housing being arranged to engage the tapered disks only on one side of the axis of the drive shaft whereby there is a tendency to cant the piston in the housing, and circumferentially and angularly disposed guideways for connecting the piston to the housing to hold the piston against canting action while permitting it to shift axially.

7. In a variable speed power transmitting apparatus, the combination of a drive shaft, a plurality of axially shiftable tapered driving disks upon the drive shaft, a driven member comprising a housing having driven members overlapping and frictionally engaging between the driving disks with curvilinear contact, a driven shaft associated with the housing, a second housing over the driven shaft, gears therein effective for braking the driving connection and for reversing the direction of power transmission, means for shifting transversely of the axis of the drive shaft, both housings, the driven shaft, and said gears for effecting variable speeds, a piston located in the first mentioned housing, fluid pressure means acting upon the piston to pack the driving disks and driven members together, the said piston assuming various longitudinal positions as the housing is so shifted, and said fluid pressure means serving to exert a substantially uniform pressure on said piston in said various positions.

8. A power transmitting device comprising, a drive shaft with tapered driving disks thereon, a driven housing having driven members between the driving disks, a driven shaft carried by the housing, a piston in the housing, a duct provided in the driven shaft, means connected with the duct for supplying fluid under pressure through said duct into the housing to act upon the piston, and valve means for controlling the flow of the fluid into the housing, a valve controlled discharge conduit for the fluid in the housing, and spring means acting upon the piston to retract it to discharge said fluid.

In testimony whereof I affix my signature.

ADRIAN O. ABBOTT, Jr.